United States Patent
Books et al.

(10) Patent No.: US 10,808,670 B2
(45) Date of Patent: Oct. 20, 2020

(54) ENGINE STOP/START ENABLEMENT BASED ON COMBUSTION PARAMETERS

(71) Applicant: Cummins Inc., Columbus, IN (US)

(72) Inventors: Martin T. Books, Columbus, IN (US); Vivek A. Sujan, Columbus, IN (US); J. Steven Kolhouse, Columbus, IN (US); Robert E. Cochran, Columbus, IN (US); Eric A. Pyers, Scipio, IN (US)

(73) Assignee: Cummins Inc., Columbus, IN (US)

( * ) Notice: Subject to any disclaimer, the term of this patent is extended or adjusted under 35 U.S.C. 154(b) by 4 days.

(21) Appl. No.: 16/181,769

(22) Filed: Nov. 6, 2018

(65) Prior Publication Data

US 2019/0072064 A1    Mar. 7, 2019

Related U.S. Application Data

(63) Continuation of application No. PCT/US2016/034246, filed on May 26, 2016.

(51) Int. Cl.
| | |
|---|---|
| *F02N 11/08* | (2006.01) |
| *B60K 6/26* | (2007.10) |
| *B60W 20/10* | (2016.01) |
| *F02N 11/04* | (2006.01) |
| *F02D 41/06* | (2006.01) |

(52) U.S. Cl.
CPC ............ *F02N 11/0829* (2013.01); *B60K 6/26* (2013.01); *F02N 11/0818* (2013.01); *F02N 11/0822* (2013.01); *B60W 20/10* (2013.01); *B60Y 2200/92* (2013.01); *B60Y 2300/192* (2013.01); *F02D 41/064* (2013.01); *F02N 11/04* (2013.01); *F02N 11/0825* (2013.01); *F02N 2200/023* (2013.01); *F02N 2200/06* (2013.01); *F02N 2200/121* (2013.01); *F02N 2200/122* (2013.01)

(58) Field of Classification Search
CPC ............ F02N 11/0829; F02N 11/0818; F02N 11/0822; F02N 2200/122; F02N 2200/06; F02N 2200/121; F02N 11/0825; F02N 11/04; F02N 2200/023; B60K 6/26; F02D 41/064; B60Y 2200/92; B60Y 2300/192; B60W 20/10
See application file for complete search history.

(56) References Cited

U.S. PATENT DOCUMENTS

| | | |
|---|---|---|
| 6,367,450 B1 | 4/2002 | Kato |
| 6,532,926 B1 | 3/2003 | Kuroda et al. |
| 6,817,330 B1 | 11/2004 | Ogawa et al. |
| 6,895,744 B2 | 5/2005 | Osawa |

(Continued)

OTHER PUBLICATIONS

Search Report and Written Opinion, PCT Appln. No. PCT/US2016/34246, dated Aug. 30, 2016, 10 pgs.

*Primary Examiner* — Joseph J Dallo
(74) *Attorney, Agent, or Firm* — Taft Stettinius & Hollister LLP (57) ABSTRACT

Apparatuses, systems, methods, and techniques relating to engine start/stop functionality are disclosed. Automatic engine start/stop controls can be disabled during engine operating conditions in which one or more combustion parameters indicate a lack of combustion stability in one or more cylinders of the engine. Engine start/stop controls are enabled when the one or more combustion parameters satisfy combustion parameter conditions indicating combustion stability in the one or more cylinders.

28 Claims, 3 Drawing Sheets

(56) References Cited

U.S. PATENT DOCUMENTS

| | | | |
|---|---|---|---|
| 7,406,378 B2 | 7/2008 | Harada et al. | |
| 7,826,961 B2 | 11/2010 | Jinno | |
| 2004/0015285 A1* | 1/2004 | Mitsutani | F02D 31/003 701/101 |
| 2004/0262995 A1 | 12/2004 | Hawkins | |
| 2005/0197236 A1 | 9/2005 | Doering et al. | |
| 2006/0150937 A1 | 7/2006 | Lupo et al. | |
| 2007/0199533 A1* | 8/2007 | Takahashi | F02D 17/04 123/179.4 |
| 2008/0147294 A1 | 6/2008 | Tomatsuri et al. | |
| 2010/0042311 A1* | 2/2010 | Nakai | F02D 41/062 701/112 |
| 2011/0166745 A1 | 7/2011 | Tiwari et al. | |
| 2012/0277983 A1* | 11/2012 | Makino | F02D 35/027 701/113 |
| 2013/0074795 A1 | 3/2013 | Michel et al. | |
| 2013/0318967 A1 | 12/2013 | Gaertner et al. | |

* cited by examiner

ENGINE STOP/START ENABLEMENT BASED ON COMBUSTION PARAMETERS

CROSS-REFERENCE TO RELATED APPLICATION

The present application is a continuation of International Patent Application No. PCT/US16/34246 filed on May 26, 2016, which is incorporated herein by reference in its entirety.

FIELD OF THE INVENTION

The present application relates generally to engine start/stop controls for powertrains and more particularly, but not exclusively to enablement of engine start/stop controls in response to one or more combustion parameters for vehicle powertrains.

BACKGROUND

A common challenge in internal combustion engine (ICE) operation involves the stabilization of fuel combustion during the initial period following the start of a cold ICE. Conditions such as cold intake air running through cold metal channels combining with cold fuel in a cold engine cylinder create combustion problems, such as incomplete combustion and misfire. In addition, excessive cold temperatures in a cooled exhaust gas recirculation (EGR) system can cause water condensation and resulting corrosion problems, so EGR is frequently disabled during cold ICE operating conditions. Similarly, exhaust aftertreatment components typically require elevated temperatures above cold start conditions to function in a desired manner. Cold ICE operation may also render emission control devices ineffective or unusable. As a result, cold engine compensation control of the ICE provides a warm-up operating period critical for efficient combustion as well as emissions compliance. Specialized engine control methods are typically employed to alter the combustion timing, combustion mixture/recipe, and EGR and exhaust aftertreatment usage to mitigate the effects of cold ICE operation under cold engine compensation control operations.

The advent of automatic engine stop/start technology has complicated mitigation strategies to deal with cold engine operation issues due to the desire to automatically (such as without operator input) shut the ICE down as often as possible to avoid ICE idling conditions and save fuel. Start/stop operations can have the effect of prolonging the ICE warm-up period and extending the duration of the symptoms of inefficient operation due to temperatures being too low for the desired operating conditions. Thus, the fuel saving benefits of automatic engine stop/start operations can be offset by the inefficiencies created by prolonged operation of a cold or not fully warmed up ICE.

A typical approach to reducing the impact of cold ICE operations in an automatic engine start/stop system is to simply delay allowing automatic stop/start operations until the ICE temperature, typically determined by engine coolant temperature, exceeds some threshold value. This approach, while simple to implement, does not directly address combustion processes, such as those associated with or that indicate combustion stability, including combustion robustness and optimization, which are critical to engine operation. As a result, the enablement of automatic engine start/stop operations may occur when one or more operating parameters in one or more cylinders indicate combustion instability in the one or more cylinders. Therefore, further improvements in this technology area are needed.

DISCLOSURE OF ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment of the present disclosure is a unique controls process providing improved automatic engine start/stop functionality. In one form, the controls process delays or disables automatic engine stop/start operations until after combustion parameters of the ICE have stabilized at in-cylinder combustion conditions indicative of normal or nominal operating conditions. In one embodiment, the normal or nominal operating conditions include a lack of misfire and/or incomplete combustion events in the one or more cylinders. This enablement/disablement determination is accomplished by monitoring one or more operating parameters associated with the actual combustion processes in the ICE cylinders, and providing a start/stop enablement command or output when the combustion parameter(s) are within normal or optimal ranges indicative of combustion stability. In further embodiments, one or more operating conditions of the vehicle systems and/or one or more in-cylinder combustion parameters must be satisfied for enablement of automatic engine start/stop controls. Further embodiments, forms, objects, features, advantages, aspects, and benefits shall become apparent from the following description and drawings.

DETAILED DESCRIPTION

Figure 1:
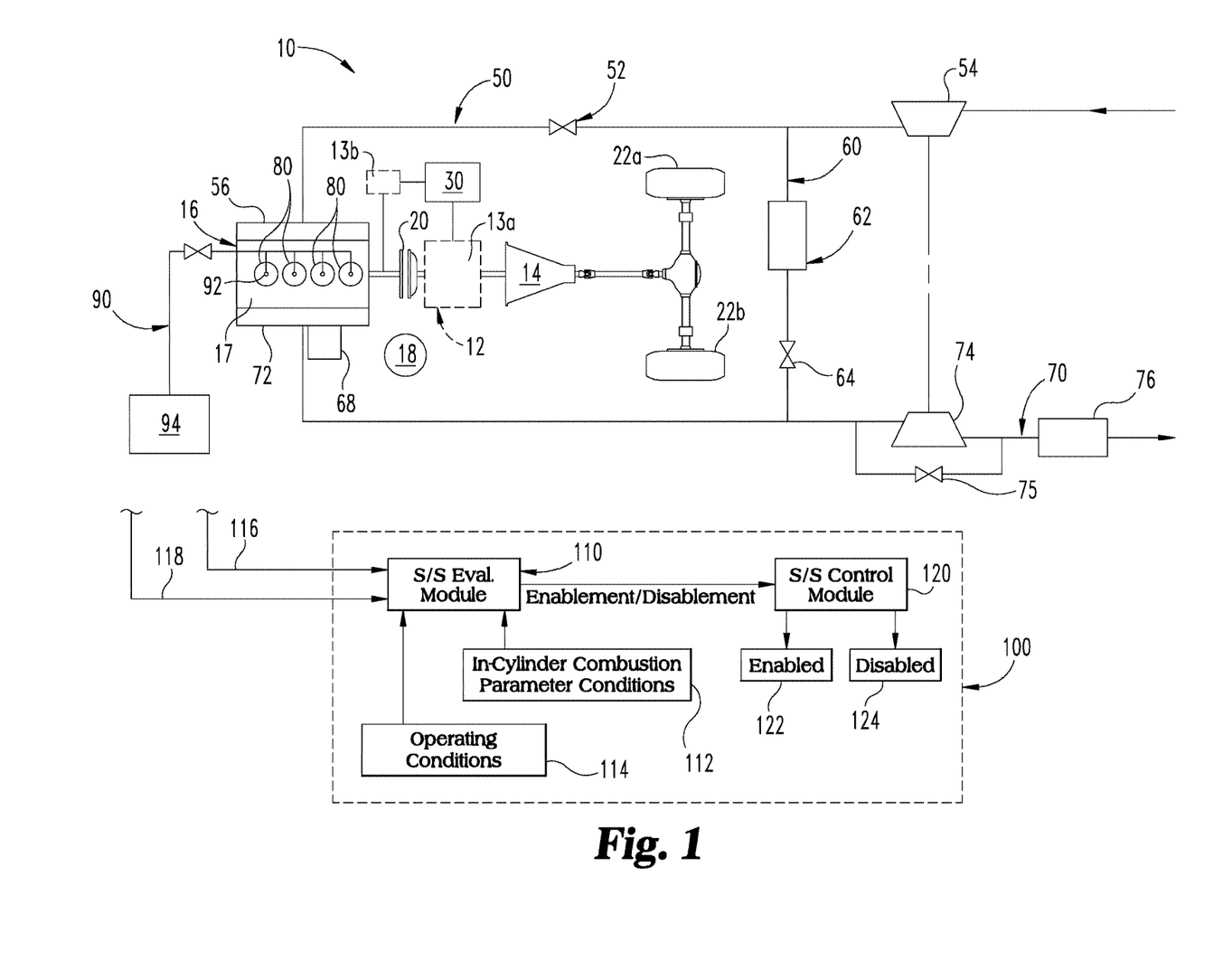
FIG. 1 illustrates a partially schematic view of an exemplary vehicle system that is equipped with automatic engine start/stop control capabilities.

With reference to FIG. 1 there is illustrated an exemplary vehicle system 10. The vehicle system 10 comprises a plurality of systems including a motor/generator system 12, a transmission system 14, an engine system 16, and an operator controls system 18. In one embodiment, these systems are supported on a vehicle chassis (not shown) such as a heavy duty on-highway truck, however, it shall be appreciated that a variety of different types of vehicle chassis are also contemplated. Non-limiting examples of these include on-highway vehicles, off-highway vehicles, construction equipment, mining trucks, buses, and passenger vehicles, among others.

Engine system 16 may be provided in a variety of forms. In an exemplary embodiment, engine system 16 includes a compression ignition internal combustion engine 17 with a turbocharged air intake system 50 and an exhaust aftertreatment system 70. However, non-turbocharged systems are also contemplated.

Intake system 50 may further be connected to an exhaust gas recirculation system 60 including, in the illustrated embodiment, and EGR cooler 62 and an EGR flow control valve 64. EGR system 60 may include an EGR cooler bypass (not shown), an accumulator, mixer or other suitable devices for providing and controlling EGR flow to intake system 50. In one embodiment, intake system 50 includes an intake throttle 52 and a compressor 54 to receive and compress intake air and, if an EGR system is provided, the compressed intake air mixes with the EGR flow and is provided to intake manifold 56 of engine system 16.

In the illustrated embodiment, EGR system 60 is a high pressure EGR system. Other embodiments contemplate low pressure EGR systems in addition to or as an alternative to high pressure EGR systems. In still other embodiments, no EGR system is provided.

Figure 2:
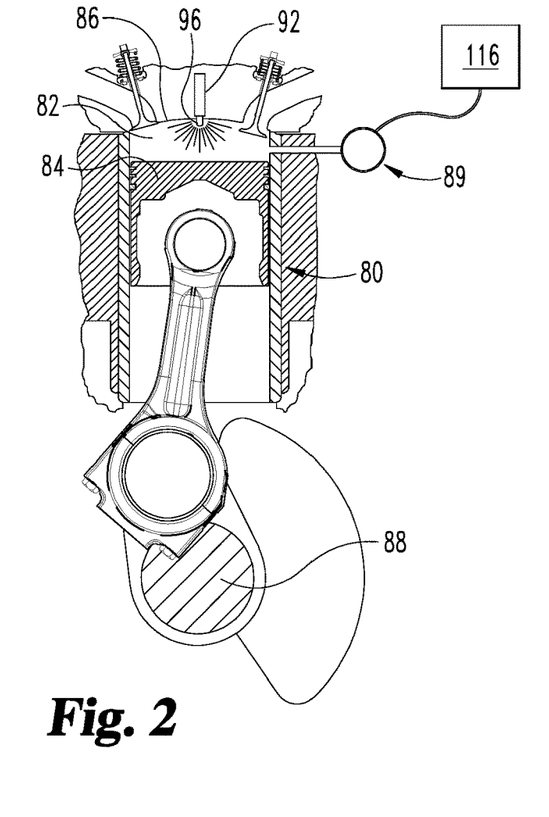
FIG. 2 is a schematic illustration of an engine cylinder of an internal combustion engine of the vehicle system of FIG. 1.

Engine 17 of engine system 16 includes an engine block with one or more cylinders 80 that each include a combustion chamber 82 (FIG. 2) for receiving the charge flow from intake system 50. For example, in the depicted embodiment, the engine 17 includes four cylinders 80 in an in-line arrangement. However, the engine 17 may have any different number of cylinders 80, as well as cylinders 80 in a variety of different arrangements. Additionally, as shown in FIG. 2, each cylinder 80 is sized to accommodate the slideable reciprocating displacement of a piston 84 along at least a portion of the cylinder 80 such that the piston 84 may reciprocate between a top-dead-center position and a bottom-dead-center position. Each of the cylinders 80, its respective piston 84, and cylinder head 86 form combustion chamber 82. Further, at least a portion of the forces generated by the slideable displacement of the piston 84 along at least a portion of the cylinder 80 during combustion events in the combustion chamber 82 are transmitted to a mechanical drive system. For example, the pistons 84 are typically operably coupled to a crank shaft 88 of the engine system 16 that converts the reciprocal movement of the pistons 84 of the engine 17 into rotational movement.

Exhaust system 70 includes an exhaust manifold 72 to receive exhaust flow from cylinders 80 and a turbine 74 operatively connected to compressor 54 to form a turbocharger. Multiple turbocharger systems are also possible. Turbine 74 may include a wastegate bypass 75 or a controllable inlet (not shown) to control the exhaust flow therethrough. An aftertreatment system 76 receives the exhaust flow and provides treatment to reduce pollutants in the exhaust before the exhaust is discharged to atmosphere. Any suitable components for aftertreatment system 76 are contemplated, including particulate filters, selective catalytic reduction (SCR) catalysts, NOx reduction catalysts, oxidation catalysts, three-way catalysts, NOx and/or hydrocarbon storage devices, ammonia oxidation catalysts, catalytic converters, liquid and gaseous ammonia delivery systems, and reductant injectors, for example.

The vehicle system 10 may also include a waste heat recovery system 68 associated with engine 17 that is configured to receive waste heat energy from at least one of engine system 16 and exhaust system 70. Waste heat recovery system 68 can be, for example, a steam turbine, thermoelectric generator, or other device that converts waste heat energy to usable electric energy for the energy storage system 30 or that is converted to mechanical energy and applied to the crankshaft.

Motor/generator system 12 may also be provided in a variety of forms. For example, motor/generator system 12 may be arranged to provide so-called parallel hybrid systems, series hybrid systems, or in a variety of other configurations, such as shown with motor 13a. In the illustrated embodiment, a clutch 20 is provided between motor/generator system 12 and engine system 16 to drive wheels 22a, 22b and allow for selective propulsion of the vehicle system by one of engine system 16 or motor/generator system 12, and by combining outputs thereof. Other arrangements and locations for clutch 20 are contemplated, including vehicle systems 10 with no clutch 20.

Non-hybrid systems are also contemplated where vehicle propulsion is provided solely by engine system 16 and motor/generator system 12 is provided as a starter/accessory motor 13b for operation of vehicle accessories and/or engine starting, but not for propulsion of the vehicle system 10. Applications that employ both hybrid motors for propulsion and/or engine starting along with additional motor(s) for accessories and/or engine starting are also contemplated.

Transmission system 14 may also be provided in a variety of forms including, for example, automatic transmissions, manual transmissions, and automated manual transmissions. Operator controls 18 typically include an accelerator pedal, a brake pedal, and a parking brake control, among other controls. It is contemplated that various other operator controls may be used depending upon the particular type of vehicle chassis which is utilized and the particular arrangement of the operator cabin. It is further contemplated the operator controls 18 may be suitable for a self-driving or vehicles that do not include an in-vehicle operator. It is also contemplated that that the controls, control systems, and control devices disclosed herein may be utilized in connection with intelligent transport systems and services which comprises systems that integrate information and communication technologies with transport infrastructure to improve economic performance, safety, mobility and environmental sustainability. In any embodiment, operator controls 18 are configured and operable to allow operator inputs, whether from within the vehicle or remotely, to start, stop and maneuver the vehicle system 10 and allow for manual starting and stopping of engine 17.

Vehicle system 10 further includes an energy storage system 30 which is operatively coupled with motor/generator system 12. It is contemplated that energy storage system 30 may take a variety of forms. For example, energy storage system 30 may include a battery pack and power electronics for power conversion between energy storage system 30 and motor/generator system 12. Other embodiments contemplate alternate forms of energy storage system 30, for example, hydraulic energy storage systems and pneumatic energy storage systems, among others. It shall be appreciated that motor/generator system 12 may also be configured as either an electrical motor/generator system, or a hydraulic, pneumatic or other type of motor/generator system.

Vehicle system 10 includes a fuelling system 90 connected to each of the cylinders 80. In certain embodiments, each of the cylinders 80 includes a direct injector 92 for providing fueling from a fuel source 94 of fuelling system 90. A direct injector, as utilized herein, includes any fuel injection device that injects fuel directly into the cylinder volume, and is capable of delivering fuel into the cylinder volume of the combustion chamber 82 when the intake valve(s) and/or exhaust valve(s) are closed. The direct injector 92 may be structured to inject fuel at the top of the cylinder as shown in FIG. 2 or laterally. In certain embodiments, the direct injector 92 may be structured to inject fuel into a combustion pre-chamber, although a combustion pre-chamber is not required. Each cylinder 80 may include one or more direct injectors.

The direct injectors 92 may be the primary or the only fueling device for the cylinders 80, or alternatively the direct injectors 92 may be an auxiliary or secondary fueling device for the cylinders 80. In certain embodiments, the direct injectors 92 are capable of providing the entire designed fueling amount for the cylinders 80 at any operating condition in which a fuelling command is provided. Alternatively, the direct injectors 92 may be only partially capable of providing the designed fuelling amount, for example the direct injectors may be capable of providing a designated amount of fuel for a specific purpose.

In still other embodiments, cylinders 80 include a port injector (not shown) in addition to or alternatively to direct injectors 92. In these embodiments, the intake manifold 52 may be divided (not shown) to separate the charge flows to the respective cylinder or cylinder groups, or the port fuel injectors may be positioned such that no other cylinder in the engine system 16 is downstream of the port fuel injector, i.e. only the target cylinder is downstream of the port fuel injector.

In certain embodiments, the direct injectors 92 (or port injectors) of cylinders 80 operate in response to automatic engine start/stop commands provided by a controller, such as an engine control module, to fuel system 90 to initiate fuelling in response to an engine start command and to stop fuelling in response to an engine stop command. The stop fuelling commands can be overridden or disabled in response to disablement of automatic engine start/stop control operations according to the disclosure herein.

Figure 3:
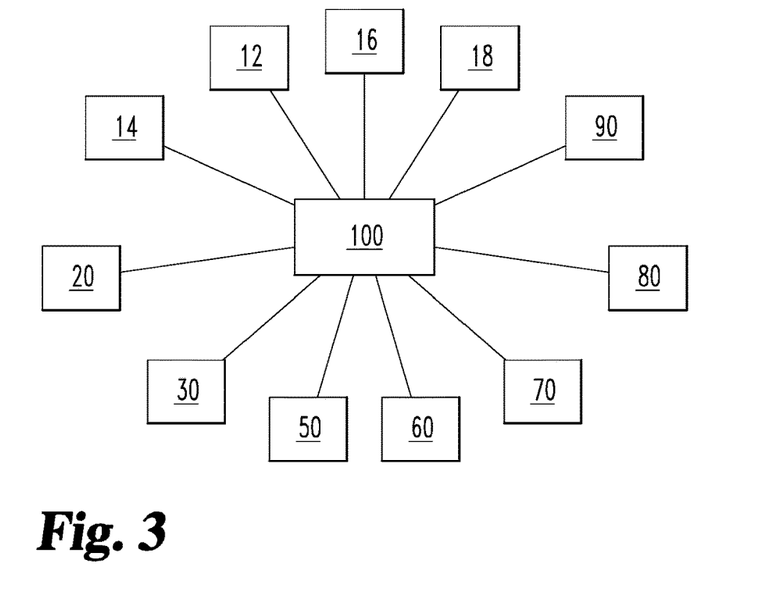
FIG. 3 is a schematic of an exemplary engine controls diagram for enablement/disablement of automatic engine start/stop controls.

Vehicle system 10 further includes a controls system including a start/stop controller 100, which may be integrated with an engine control module (ECM), or provided as a stand-alone control device or stand-alone control module. Referring further to FIG. 3, start/stop controller 100 is configured to receive information from and/or provide control commands to one or more of motor/generator system 12, transmission system 14, engine system 16, operator control system 18, clutch 20, energy storage system 30, intake system 50, EGR system 60, waste heat recover system 68, exhaust system 70, fuelling system 90 and/or cylinders 80.

In certain embodiments, start/stop controller 100 receives information regarding combustion parameters 116 (FIG. 1) within one or more of the combustion chambers 82 of one or more of the cylinders 80. As shown in FIG. 2, cylinder 80 includes an in-cylinder sensor 89 that can measure one or more of, for example, in-cylinder pressure, in-cylinder temperature, in-cylinder gas constituents, cylinder wall temperature, and injector tip temperature. In-cylinder sensor 89 may be a physical sensor or a virtual sensor.

In addition, the start/stop controller 100 can receive information regarding operating parameters 118 associated with one or more of energy storage system 30, intake system 50, EGR system 60, waste heat recovery system 68, exhaust system 70, fuelling system 90, and/or ambient conditions. Operating parameters 118 may include measurements from sensors (not shown) associated with each of these respective systems 12, 14, 16, 18, 20, 30, 50, 60, 68, 70 and 90. Operating parameters 118 may also include inputs received from another control module or controller of vehicle system 10 that provides the operating conditions 118 of one or more these systems. In a further embodiment, the operating parameters 118 include an indication of whether engine 17 is currently being operated by a cold engine compensation control process (i.e. the cold engine compensation control scheme is active), thus indicating the engine 17 is not at a desired or nominal operating temperature or condition.

At least a portion of the information from these systems and other information inputs may be provided as combustion parameters 116 and operating parameters 118 to start/stop evaluation module 110 of start stop controller 100. Certain inputs may be provided directly to start/stop evaluation module 110 whereas others may be provided using an intermediate transmitting or other device or relay device such as another control module. Start/stop evaluation module 110 also receives, retrieves, or has stored combustion parameter conditions 112 and operating conditions 114 that are used to evaluate one or more combustion parameter 116 inputs for satisfaction of combustion parameter conditions 112, and also evaluates one or more operating parameter 118 inputs for satisfaction of one or more operating conditions 114.

Start/stop controller 100 also includes an automatic engine start/stop control module 120 which receives inputs from, for example, motor/generator system 12, transmission system 14, engine system 16, operator controls system 18, clutch 20, and energy storage system 30. The start/stop control module 120 may be configured in a variety of manners to control automatic engine start events and engine stop events based upon whether criteria for an automatic start event or automatic stop event are present. The start/stop evaluation module 110 is configured to evaluate one or more combustion parameters 116 relative to combustion parameter conditions 112 to selectively enable 122 or disable 124 the automatic engine start/stop control module 120, depending on whether the combustion parameter conditions 112 are satisfied. The start/stop evaluation module 110 can further be configured to evaluate one or more operating parameters 118 relative to operating conditions 114 to selectively enable 122 or disable 124 the automatic engine start/stop control module 120, depending on whether the one or more combustion parameter conditions 112 are satisfied in addition to one or more operating conditions 114 being satisfied.

Start/stop controller 100 may be configured to implement a plurality of controls for vehicle system 10 including engine start/stop controls. It shall be appreciated that the controls described herein may also be implemented in connection with a variety of additional or alternate control systems including the alternative configurations discussed herein. It shall also be appreciated that the controls described in the present application may be implemented in various combinations of hardware, firmware and/or instructions encoded on a computer readable medium which may be provided in a single microprocessor based controller or control module or, in a plurality of such modules such as a distributed controller system in which a plurality of controllers communicate via a controller-area network (CAN). It shall further be appreciated that start/stop controller 100 may be one example of a so-called external controller which may communicate start or stop requests to an engine control module (not shown). Such configuration and functionality may be applied in a variety of contexts, for example, when an engine system is provided separately or modularly to interface with a plurality of OEM chassis including different OEM chassis control modules.

For example, start/stop evaluation module 110 need not be part of a same controller as the automatic engine start-stop control module 120. In another example, start/stop evaluation module 110 is a stand-alone processor or is part of a processor, and includes a communication network interface that is in operative communication with the various systems of vehicle system 10 to receive the various combustion parameter 116 inputs and the operating parameter 118 inputs. The processor includes a memory for storing combustion parameter conditions 112 and the operating conditions, 114, and at least one non-transitory computer readable medium configured to store instructions executable by the processor to selectively enable and disable automatic engine start/stop controls.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Figure 4:
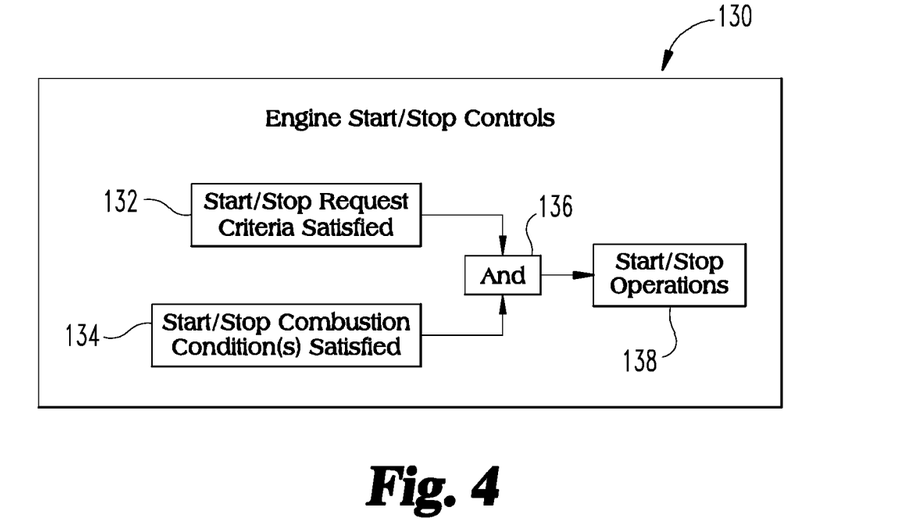
FIG. 4 is a schematic of an exemplary automatic engine start/stop control enablement/disablement logic flow diagram.

With reference to FIG. 4 there is illustrated a block diagram of exemplary engine start/stop controls 130 including a start/stop request conditional block 132 which evaluates whether one or more start/stop request criteria are satisfied. A number of forms and implementations of block 132 are contemplated. In one example, block 132 evaluates whether operator conditions, vehicle conditions, engine conditions, engine accessory conditions, and external controller conditions meet certain criteria for automatic engine start and/or automatic engine stop control to occur.

Engine start/stop controls 130 further include a start/stop combustion conditions conditional block 134 which evaluates whether one or more combustion conditions are satisfied. A number of forms and implementations of block 134 are contemplated. In one example, block 134 evaluates whether in-cylinder and/or other combustion parameters 116 meet certain combustion parameter conditions 112 indicative of stability/robustness of the combustion processes within cylinders 80 to enable automatic engine start/stop control. In still other embodiments, one or more operating parameters 118 must also satisfy one or more operating conditions 114 to enable automatic engine start/stop control.

The output of start/stop request conditional block 132 and the output of start/stop combustion conditions conditional block 134 are provided to AND operator block 136 which is configured to perform a logical AND operation relative to the outputs of blocks 132 and 134. The output of AND operator block 136 is provided to engine start/stop operations block 138. When the output of operator block 136 is true, engine start/stop operations block 138 sets the logical state of an automatic engine start/stop operational capability as true. When the output of operator block 136 is false, automatic engine start/stop operations block 138 sets the logical state of automatic engine start/stop operational capability as false.

Figure 5:
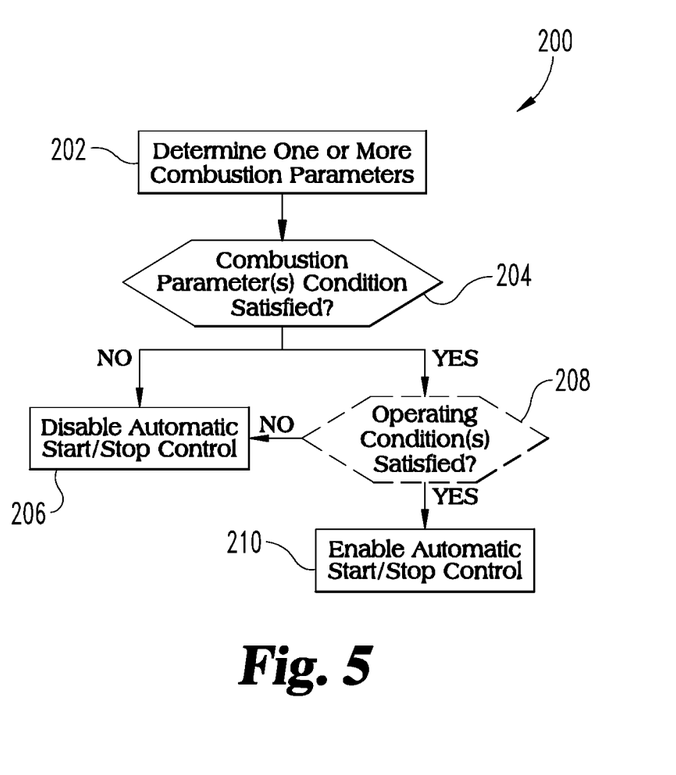
FIG. 5 is a flow diagram of an exemplary automatic engine start/stop control enablement/disablement procedure.

Referring to FIG. 5, a flow diagram of a procedure 200 is shown for enabling or disabling automatic engine start/stop control. Procedure 200 includes an operation 202 to determine one or more combustion parameters 116. At condition 204, procedure 200 determines whether the one or more combustion parameters 116 satisfy one or more combustion parameter conditions 112. If conditional 204 is FALSE, procedure 200 continues at operation 206 and disables automatic engine start/stop control.

If conditional 204 is TRUE, procedure 200 continues at either conditional 208 or operation 210 depending on which embodiment is employed. In certain embodiments, the enablement/disablement of automatic engine start/stop operations is based only on the combustion parameter conditions 112. In these embodiments, conditional 208 can be omitted, and automatic engine start/stop control is enabled at operation 210. In other embodiments, procedure 200 continues from conditional 204 at conditional 208 to determine if one or more operating conditions 114 of the vehicle system are satisfied by one or more operating parameters 118. If conditional 208 is FALSE, procedure 200 continues at operation 206 to disable automatic engine start/stop control. If conditional 208 is TRUE, procedure 200 continues at operation 210 to enable automatic engine start/stop control.

In certain embodiments, the combustion parameters 116 include measured or derived in-cylinder combustion parameter(s). In one embodiment, the in-cylinder combustion parameter is determined from a pre-ignition gas operating parameter(s). The pre-ignition gas operating parameter(s) may include one or more of a pressure, a temperature, and constituents of the gas in one or more of the cylinders 80. The gas operating parameter(s) are monitored and evaluated by start/stop evaluation module 110 for indications of a possible incomplete combustion or misfire event in one or more of the cylinders 80. The gas operating parameter(s) can be compared to a temperature, pressure and/or gas constituent threshold type of combustion parameter condition(s) 112 associated with combustion stability. For example, detection of one or more pre-ignition gas operating parameter(s) failing to satisfy in-cylinder combustion parameter condition(s) 112 result in automatic start/stop operational capability by start/stop control module 120 being disabled.

In another embodiment, the combustion parameter 116 is determined from an in-cylinder combustion event. In one embodiment, the in-cylinder combustion event parameter(s) are one or more of a pressure, temperature, or other parameter that occurs during combustion in the cylinder indicating an incomplete combustion or misfire event in one or more of the cylinders 80. The in-cylinder combustion event parameter(s) are received and evaluated by start/stop evaluation module 110 for indications of an incomplete combustion or misfire event, such as by determining whether the pressure or temperature is less than a threshold associated with the in-cylinder combustion parameter(s) failing to satisfy combustion parameter conditions 112 that indicate combustion stability. For example, detection of one or more combustion event parameter(s) failing to satisfy in-cylinder combustion parameter condition(s) 112 results in automatic start/stop operational capability by start/stop control module 120 being disabled.

In yet another embodiment, a cylinder wall temperature is a combustion parameter 116 monitored by start/stop evaluation module 110 for an indication of an incomplete combustion or misfire event in one or more of the cylinders 80. The cylinder wall temperature parameter can be associated with one or more in-cylinder combustion parameter conditions 112 such as a cylinder wall temperature threshold that indicates the presence or absence combustion stability. For example, detection of an in-cylinder wall temperature failing to satisfy in-cylinder combustion parameter conditions 112 such as a temperature threshold results in automatic start/stop operational capability by start/stop control module 120 being disabled.

In another embodiment, the combustion parameter 116 is a temperature of a tip 96 of fuel injector 92 in cylinder 80. Fuel injector tip temperatures are monitored and evaluated by start/stop evaluator module 110 to determine a fuel injector tip temperature below a certain temperature threshold indicated by the in-cylinder combustion parameter conditions 112 that indicate the presence or lack of combustion stability. In response to the fuel injector tip temperature being below the threshold and failing to satisfy the in-cylinder combustion parameter conditions 112, automatic engine start/stop operational capabilities are disabled.

In further embodiments, start/stop evaluation module 110 can additionally evaluate one or more operating parameters 114 for satisfaction of one or more operating conditions 118 in conjunction with the combustion parameters 112 in determining whether to enable or disable automatic engine start/stop operational capabilities. For example, in one embodiment, one or more operating parameters of fuelling system 90, such as a temperature and/or a pressure of fuel provided to cylinder(s) 80, can be monitored for indications of operating parameters failing to satisfy one or more operating conditions 114, such as a fuel pressure threshold and/or fuel temperature threshold. In response to the pressure and/or temperature of the fuel failing to satisfy operating conditions 112, automatic engine start/stop operational capability is disabled.

In another embodiment, operating parameter 118 is a measurement of exhaust gas constituents in the exhaust flow of exhaust system 70, and the operating condition 114 is threshold amount of one or more exhaust gas constituents being present or absent. In still other embodiments, the operating parameter 118 is a temperature condition of one or more components associated with the aftertreatment device(s) 76, such as an SCR catalyst, DPF, catalytic converter, etc. The aftertreatment device(s). The operating condition 114 can be an under-temperature operating condition such as a temperature threshold. Upon detection of such an under-temperature operating parameter and/or in the event the exhaust gas constituents do not satisfy the operating condition 114 for the aftertreatment device(s) 76, automatic engine start/stop operational capability of start/stop control module 120 can be disabled.

In still another embodiment, operating parameters 118 of EGR system 60 are monitored for indications of overcooling and/or condensation operating conditions 114. Examples of operating parameters 118 for EGR system 60 that can be monitored and compared to associated operating conditions 114 include one or more of the temperature of the EGR flow or EGR components, coolant temperature of an EGR cooler, constituents of the EGR flow, the EGR flow rate, or other operating parameters. Start/stop evaluation module 110 provides a disablement command to start/stop control module 120 to disable automatic engine start/stop operational capability of start/stop control module 120 in response to the EGR operating parameter(s) filing to meet the EGR operating conditions 114.

In still other embodiments, the operating parameter 118 includes a heat rejection amount from waste heat recovery system 68 that is monitored and compared to an operating condition 114 indicative of the amount of heat rejection. Start/stop evaluation module 110 provides a disablement command to start/stop control module 120 to disable automatic engine start/stop operational capability of start/stop control module 120 in response to the measured heat rejection amount failing to satisfy the heat rejection operating condition.

In yet another embodiment, the cold engine compensation controls for engine system 16 can provide an input to the start/stop evaluation module 110 indicating whether the cold engine compensation controls of engine system 16 are active and currently controlling engine operations. When the cold engine combustion controls are active, start/stop evaluation module 110 provides a command to start/stop control module 120 to disable automatic engine start/stop operational capability. Furthermore, one or more ambient operating parameters such as temperature and/or humidity can be determined, and can be used to disable operational capability of the engine start/stop control module 120 in response to one or more ambient operating conditions not being satisfied.

It should be understood that any combination of combustion parameter conditions 112 can be required to be satisfied in order to enable automatic engine start/start control capabilities. It should further be understood that any combination of or more combustion parameter conditions 112 and operating conditions 114 can be required to be satisfied to enable automatic engine start/stop control capabilities. If one or more of these conditions 112, 114 is not satisfied, then engine start/stop capabilities are disabled. When all of the selected conditions 112, 114 are satisfied, or when a designated subset of one or more of the conditions 112, 114 is satisfied, the engine start/stop control capabilities are enables.

The combustion parameters 116 and operating parameters 118 may be comparted to combustion parameter conditions 112 and/or operating conditions 114 that are a single threshold value, a variable threshold, a range of clause, a data trend (including confirmation times), a value that varies over time and/or in response to one or more operating conditions, or other suitable condition values. In addition, combustion parameters 116 and/or operating parameters 118 can be sensed values and/or derived values utilizing multiple sensed parameters.

According to one aspect of the present disclosure, a method for operating a vehicle that includes an engine system including an internal combustion engine, an operator control system operably coupled to the engine system operable to start and stop the internal combustion engine in response to operator inputs, and a start/stop controller operable to control automatic engine start/stop operations of the internal combustion engine independently of the operator control system is discloses. The method includes determining one or more combustion parameters in one or more cylinders of the internal combustion engine; disabling automatic engine start/stop control of the internal combustion engine by the start/stop controller in response to the one or more combustion parameters not satisfying a combustion parameter condition indicating a combustion stability in the one or more cylinders; and enabling the automatic engine start/stop control of the internal combustion engine by the start/stop controller in response to the one or more combustion parameters satisfying the combustion parameter condition.

In one embodiment, the one or more combustion parameters include an in-cylinder pre-ignition gas parameter and the combustion parameter condition is indicative of an absence of incomplete combustion and misfire events in the one or more cylinders. In a refinement of this embodiment, the in-cylinder pre-ignition gas condition includes at least one of an in-cylinder pressure, an in-cylinder temperature and an in-cylinder gas constituent of the one or more cylinders, and the combustion parameter condition includes at least one of an in-cylinder pressure threshold, an in-cylinder temperature threshold, and an in-cylinder gas constituent amount.

In another embodiment, the one or more combustion parameters includes an in-cylinder combustion parameter and the combustion parameter condition is indicative of an absence of at least one of incomplete combustion and misfire events in the one or more cylinders. In a refinement of this embodiment, the in-cylinder combustion parameter includes at least one of an in-cylinder pressure and an in-cylinder temperature of the one or more cylinders and the combustion parameter condition includes at least one of an in-cylinder pressure threshold and an in-cylinder temperature threshold.

In yet another embodiment, the one or more combustion parameters include a cylinder wall temperature in the one or more cylinders and the combustion parameter condition includes a cylinder wall temperature threshold. In still another embodiment, the method includes disabling automatic engine start/stop control in response to a fuelling system operating parameter providing fuel to the one or more cylinders failing to satisfy at least one of a fuel temperature operating condition and a fuel pressure operating condition.

In another embodiment, the one or more combustion parameters include a fuel injector tip temperature of a fuel injector associated with the one or more cylinders and the combustion parameter condition includes a fuel injector tip temperature operating condition. In yet another embodiment, the method includes disabling the automatic engine start/stop control in response to an EGR system operating parameter indicative of at least one of an overcooling condition and a condensation operating condition in an EGR system connected to the engine system. In a refinement of this embodiment, the EGR system operating parameter includes at least one of an EGR temperature, a coolant temperature of an EGR cooler, an EGR flow rate, and gas constituents in the recirculated exhaust gas.

In another embodiment, the method includes disabling the automatic engine start/stop control in response to determining an exhaust aftertreatment device operating parameter indicative of an under-temperature operating condition of the exhaust aftertreatment device. In yet another embodiment, the method includes disabling the automatic engine start/stop control in response to determining a cold engine compensation control operating parameter of the engine system is in an active operating condition. In still another embodiment, the method includes disabling the automatic engine start/stop control in response to a waste heat recovery system operating parameter indicating of a heat rejection operating condition less than a threshold amount.

In another embodiment, the vehicle further includes a motor/generator system operatively coupled with the engine system, and an energy storage system operatively coupled with the motor/generator system. In yet another embodiment, the combustion parameter condition includes at least one of a single threshold value, a variable threshold value, a range of values, and a derived value. In still another embodiment, the in-cylinder combustion parameter is at least one of a sensed value and a derived value from one or more sensed values.

According to another aspect, a vehicle system includes an internal combustion engine operatively coupled with a transmission system, the internal combustion engine including one or more cylinders for combustion of a fuel. The system also includes an engine start/stop controller in operative communication with the internal combustion engine. The engine start/stop controller is configured to automatically stop and start the internal combustion engine in response to engine start/stop criteria. The engine start/stop controller is further configured to disable the automatic start/stop control of the internal combustion engine in response to one or more in-cylinder combustion parameters not satisfying one or more combustion parameter conditions and to enable the automatic start/stop control of the internal combustion engine by the engine start/stop controller in response to the one or more in-cylinder combustion parameters satisfying the one or more combustion parameter conditions. The one or more combustion parameter conditions are indicative of a combustion stability in the one or more cylinders.

In one embodiment, the system includes a motor/generator system operatively coupled with the engine system and an energy storage system operatively coupled with the motor/generator system.

In another embodiment, the automatic start/stop control of the internal combustion engine is only enabled in response to the engine start/stop controller determining that the in-cylinder combustion parameters satisfy two or more combustion parameter conditions. In a refinement of this embodiment, the two or more combustion parameter conditions include at least two of the following: an in-cylinder pre-ignition gas parameter indicating a lack of incomplete combustion and misfire events in the one or more cylinders; an in-cylinder combustion event parameter indicating a lack of incomplete combustion and misfire events in the one or more cylinders; a cylinder wall temperature in the one or more cylinders exceeding a cylinder wall temperature threshold; and a fuel injector tip temperature of a fuel injector associated with the one or more cylinders exceeding a fuel injector tip temperature threshold.

In another embodiment, the automatic start/stop control of the internal combustion engine is only enabled in response to the engine start/stop controller determining that the one or more in-cylinder combustion parameter satisfy at least one combustion parameter condition and that at least one operating parameter of the vehicle system satisfies at least one operating condition of the vehicle system. In a refinement of this embodiment, the at least one combustion parameter condition includes at least one of the following: an in-cylinder pre-ignition gas parameter indicating a lack of incomplete combustion and misfire events in the one or more cylinders; an in-cylinder combustion event parameter indicating a lack of incomplete combustion and misfire events in the one or more cylinders; a cylinder wall temperature parameter in the one or more cylinders exceeding a cylinder wall temperature threshold; a fuel injector tip temperature parameter of a fuel injector associated with the one or more cylinders exceeding a fuel injector tip temperature threshold. In addition, the at least one operating condition of the vehicle system includes at least one of the following: a fuelling system operating parameter of a fuel system providing fuel to the one or more cylinders satisfying at least one of a fuel temperature operating condition and a fuel pressure operating condition; an EGR operating parameter indicating an absence of an overcooling operating condition or a condensation operating condition in an EGR system; an exhaust aftertreatment device operating parameter indicating an absence of an under-temperature operating condition of an exhaust aftertreatment device; a heat rejection operating parameter of a waste heat recovery system associated with the internal combustion engine indicating a heat rejection operating condition more than a threshold amount; and an ambient operating parameter satisfying an ambient operating condition. In still a further refinement, the in-cylinder pre-ignition gas parameter and the in-cylinder combustion event parameter are determined in response to at least one of an in-cylinder pressure, an in-cylinder temperature, and in-cylinder gas constituents of the one or more cylinders.

In another embodiment, the automatic start/stop control of the internal combustion engine is disabled in response to the engine start/stop controller determining that at least one combustion parameter condition is not satisfied and at least one operating condition of the vehicle system is not satisfied. In a refinement of this embodiment, the at least one combustion parameter condition includes at least one of the following: an in-cylinder pre-ignition gas parameter indicating incomplete combustion and misfire events in the one or more cylinders; an in-cylinder combustion event parameter indicating incomplete combustion and misfire events in the one or more cylinders; a cylinder wall temperature parameter in the one or more cylinders being less than a cylinder wall temperature threshold; and a fuel injector tip temperature parameter of a fuel injector associated with the one or more cylinders being less than a fuel injector tip temperature threshold. In addition, the at least one operating condition of the vehicle system includes at least one of the following: a fuelling system operating parameter of a fuel system providing fuel to the one or more cylinders not satisfying at least one of a fuel temperature operating condition and a fuel pressure operating condition; an EGR operating parameter indicating an overcooling operating condition or a condensation operating condition in an EGR system; an exhaust aftertreatment device operating parameter indicating an under-temperature operating condition of an exhaust aftertreatment device; a heat rejection operating parameter of a waste heat recovery system associated with the internal combustion engine indicating a heat rejection operating condition less than a threshold amount; and an ambient operating parameter not satisfying an ambient operating condition.

According to another aspect, a controller apparatus includes at least one processor, a communication network interface in operative communication with the processor, and at least one non-transitory computer readable medium configured to store instructions executable by the processor to evaluate one or more combustion parameters for selectively enabling and disabling an engine start/stop controls in response to one or more combustion parameter conditions. The one or more combustion parameter conditions are indicative of a combustion stability in one or more internal combustion engine cylinders. The one or more combustion parameters are received by the communication network interface, and automatic start/stop controls of an internal combustion engine are disabled in response to the one or more combustion parameters not satisfying the one or more combustion parameter conditions and the automatic start/stop controls of the internal combustion engine are enabled in response to the one or more combustion parameters satisfying one or more combustion parameter conditions.

In one embodiment, the automatic start/stop control of the internal combustion engine is enabled in response to the processor determining that two or more combustion parameter conditions are satisfied by two or more combustion parameters. The two or more combustion parameter conditions include at least two of the following: an in-cylinder pre-ignition gas parameter indicating a lack of incomplete combustion and misfire events in the internal combustion engine cylinder; an in-cylinder combustion event parameter indicating a lack of incomplete combustion and misfire events in the internal combustion engine cylinder; a cylinder wall temperature parameter in the internal combustion engine cylinder exceeding a cylinder wall temperature threshold; and a fuel injector tip temperature parameter of a fuel injector associated with the internal combustion engine cylinder exceeding a fuel injector tip temperature threshold.

In another embodiment, the automatic start/stop control of the internal combustion engine is disabled in response to the processor determining that the at least one combustion parameter does not satisfy at least one combustion parameter condition and further that at least one operating parameter does not satisfy at least one operating condition. The at least one combustion parameter condition includes at least one of the following: an in-cylinder pre-ignition gas parameter indicating incomplete combustion and misfire events in the internal combustion engine cylinder; an in-cylinder combustion event parameter indicating incomplete combustion and misfire events in the internal combustion engine cylinder; a cylinder wall temperature parameter in the internal combustion engine cylinder being less than a cylinder wall temperature threshold; a fuel injector tip temperature parameter of a fuel injector associated with the internal combustion engine cylinder being less than a fuel injector tip temperature threshold. The at least one operating condition includes at least one of the following: fuelling system operating parameter not satisfying one of a fuel pressure operating condition and a fuel temperature operating condition; an EGR operating parameter indicating a presence of at least one of an overcooling and a condensation operating condition; an exhaust aftertreatment device temperature parameter indicating an under-temperature operating condition; a heat rejection operating parameter indicating a heat rejection operating condition less than a threshold amount; and an ambient operating parameter not satisfying an ambient operating condition.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for operating a vehicle comprising an engine system including an internal combustion engine, an operator control system operably coupled to the engine system operable to start and stop the internal combustion engine in response to operator inputs, and a start/stop controller operable to control automatic engine start/stop operations of the internal combustion engine independently of the operator control system, the method comprising:

determining one or more combustion parameters in one or more cylinders of the internal combustion engine;

disabling automatic engine start/stop control of the internal combustion engine by the start/stop controller in response to the one or more combustion parameters not satisfying a combustion parameter condition indicating a combustion stability in the one or more cylinders; and enabling the automatic engine start/stop control of the internal combustion engine by the start/stop controller in response to the one or more combustion parameters satisfying the combustion parameter condition.

2. The method of claim 1, wherein the one or more combustion parameters include an in-cylinder pre-ignition gas parameter and the combustion parameter condition is indicative of an absence of incomplete combustion and misfire events in the one or more cylinders.

3. The method of claim 2, wherein the in-cylinder pre-ignition gas condition includes at least one of an in-cylinder pressure, an in-cylinder temperature and an in-cylinder gas constituent of the one or more cylinders, and the combustion parameter condition includes at least one of an in-cylinder pressure threshold, an in-cylinder temperature threshold, and an in-cylinder gas constituent amount.

4. The method of claim 1, wherein the one or more combustion parameters includes an in-cylinder combustion parameter and the combustion parameter condition is indicative of an absence of at least one of incomplete combustion and misfire events in the one or more cylinders.

5. The method of claim 4, wherein the in-cylinder combustion parameter includes at least one of an in-cylinder pressure and an in-cylinder temperature of the one or more cylinders and the combustion parameter condition includes at least one of an in-cylinder pressure threshold and an in-cylinder temperature threshold.

6. The method of claim 1, wherein the one or more combustion parameters include a cylinder wall temperature in the one or more cylinders and the combustion parameter condition includes a cylinder wall temperature threshold.

7. The method of claim 1, further comprising disabling automatic engine start/stop control in response to a fuelling system operating parameter providing fuel to the one or more cylinders failing to satisfy at least one of a fuel temperature operating condition and a fuel pressure operating condition.

8. The method of claim 1, wherein the one or more combustion parameters include a fuel injector tip temperature of a fuel injector associated with the one or more cylinders and the combustion parameter condition includes a fuel injector tip temperature operating condition.

9. The method of claim 1, further comprising disabling the automatic engine start/stop control in response to an exhaust gas recirculation (EGR) system operating parameter indicative of at least one of an overcooling condition and a condensation operating condition in an EGR system connected to the engine system.

10. The method of claim 9, wherein the EGR system operating parameter includes at least one of an EGR temperature, a coolant temperature of an EGR cooler, an EGR flow rate, and gas constituents in the recirculated exhaust gas.

11. The method of claim 1, further comprising disabling the automatic engine start/stop control in response to determining an exhaust aftertreatment device operating parameter indicative of an under-temperature operating condition of the exhaust aftertreatment device.

12. The method of claim 1, further comprising disabling the automatic engine start/stop control in response to determining a cold engine compensation control operating parameter of the engine system is in an active operating condition.

13. The method of claim 1, further comprising disabling the automatic engine start/stop control in response to a waste heat recovery system operating parameter indicating of a heat rejection operating condition less than a threshold amount.

14. The method of claim 1, wherein the vehicle further includes a motor/generator system operatively coupled with the engine system, and an energy storage system operatively coupled with the motor/generator system.

15. The method of claim 1, wherein the combustion parameter condition includes at least one of a single threshold value, a variable threshold value, a range of values, and a derived value.

16. The method of claim 1, wherein the in-cylinder combustion parameter is at least one of a sensed value and a derived value from one or more sensed values.

17. A vehicle system comprising:

an internal combustion engine operatively coupled with a transmission system, the internal combustion engine including one or more cylinders for combustion of a fuel;

an engine start/stop controller in operative communication with the internal combustion engine; and wherein the engine start/stop controller is configured to automatically stop and start the internal combustion engine in response to engine start/stop criteria, wherein the engine start/stop controller is further configured to disable the automatic start/stop control of the internal combustion engine in response to one or more in-cylinder combustion parameters not satisfying one or more combustion parameter conditions and to enable the automatic start/stop control of the internal combustion engine by the engine start/stop controller in response to the one or more in-cylinder combustion parameters satisfying the one or more combustion parameter conditions, wherein the one or more combustion parameter conditions are indicative of a combustion stability in the one or more cylinders.

18. The vehicle system of claim 17, further comprising:

a motor/generator system operatively coupled with the engine system; and an energy storage system operatively coupled with the motor/generator system.

19. The vehicle system of claim 17, wherein the automatic start/stop control of the internal combustion engine is only enabled in response to the engine start/stop controller determining that the in-cylinder combustion parameters satisfy two or more combustion parameter conditions.

20. The vehicle system of claim 19, wherein the two or more combustion parameter conditions include at least two of the following:

an in-cylinder pre-ignition gas parameter indicating a lack of incomplete combustion and misfire events in the one or more cylinders;

an in-cylinder combustion event parameter indicating a lack of incomplete combustion and misfire events in the one or more cylinders;

a cylinder wall temperature in the one or more cylinders exceeding a cylinder wall temperature threshold; and a fuel injector tip temperature of a fuel injector associated with the one or more cylinders exceeding a fuel injector tip temperature threshold.

21. The vehicle system of claim 17, wherein the automatic start/stop control of the internal combustion engine is only enabled in response to the engine start/stop controller determining that the one or more in-cylinder combustion parameter satisfy at least one combustion parameter condition and that at least one operating parameter of the vehicle system satisfies at least one operating condition of the vehicle system.

22. The vehicle system of claim 21, wherein the at least one combustion parameter condition includes at least one of the following:
  an in-cylinder pre-ignition gas parameter indicating a lack of incomplete combustion and misfire events in the one or more cylinders;
  an in-cylinder combustion event parameter indicating a lack of incomplete combustion and misfire events in the one or more cylinders;
  a cylinder wall temperature parameter in the one or more cylinders exceeding a cylinder wall temperature threshold;
  a fuel injector tip temperature parameter of a fuel injector associated with the one or more cylinders exceeding a fuel injector tip temperature threshold;
wherein the at least one operating condition of the vehicle system includes at least one of the following:
  a fuelling system operating parameter of a fuel system providing fuel to the one or more cylinders satisfying at least one of a fuel temperature operating condition and a fuel pressure operating condition;
  an exhaust gas recirculation (EGR) operating parameter indicating an absence of an overcooling operating condition or a condensation operating condition in an EGR system;
  an exhaust aftertreatment device operating parameter indicating an absence of an under-temperature operating condition of an exhaust aftertreatment device;
  a heat rejection operating parameter of a waste heat recovery system associated with the internal combustion engine indicating a heat rejection operating condition more than a threshold amount; and
  an ambient operating parameter satisfying an ambient operating condition.

23. The vehicle system of claim 22, wherein the in-cylinder pre-ignition gas parameter and the in-cylinder combustion event parameter are determined in response to at least one of an in-cylinder pressure, an in-cylinder temperature, and in-cylinder gas constituents of the one or more cylinders.

24. The vehicle system of claim 17, wherein the automatic start/stop control of the internal combustion engine is disabled in response to the engine start/stop controller determining that at least one combustion parameter condition is not satisfied and at least one operating condition of the vehicle system is not satisfied.

25. The vehicle system of claim 24, wherein the at least one combustion parameter condition includes at least one of the following:
  an in-cylinder pre-ignition gas parameter indicating incomplete combustion and misfire events in the one or more cylinders;
  an in-cylinder combustion event parameter indicating incomplete combustion and misfire events in the one or more cylinders;
  a cylinder wall temperature parameter in the one or more cylinders being less than a cylinder wall temperature threshold; and
  a fuel injector tip temperature parameter of a fuel injector associated with the one or more cylinders being less than a fuel injector tip temperature threshold;
wherein the at least one operating condition of the vehicle system includes at least one of the following:
  a fuelling system operating parameter of a fuel system providing fuel to the one or more cylinders not satisfying at least one of a fuel temperature operating condition and a fuel pressure operating condition;
  an exhaust gas recirculation (EGR) operating parameter indicating an overcooling operating condition or a condensation operating condition in an EGR system;
  an exhaust aftertreatment device operating parameter indicating an under-temperature operating condition of an exhaust aftertreatment device;
  a heat rejection operating parameter of a waste heat recovery system associated with the internal combustion engine indicating a heat rejection operating condition less than a threshold amount; and
  an ambient operating parameter not satisfying an ambient operating condition.

26. A controller apparatus comprising:
  at least one processor;
  a communication network interface in operative communication with the processor; and
  at least one non-transitory computer readable medium configured to store instructions executable by the processor to evaluate one or more combustion parameters for selectively enabling and disabling an engine start/stop controls in response to one or more combustion parameter conditions;
  wherein the one or more combustion parameter conditions are indicative of a combustion stability in one or more internal combustion engine cylinders, wherein the one or more combustion parameters are received by the communication network interface, and wherein automatic start/stop controls of an internal combustion engine are disabled in response to the one or more combustion parameters not satisfying the one or more combustion parameter conditions and the automatic start/stop controls of the internal combustion engine are enabled in response to the one or more combustion parameters satisfying one or more combustion parameter conditions.

27. The controller apparatus of claim 26, wherein the automatic start/stop control of the internal combustion engine is enabled in response to the processor determining that two or more combustion parameter conditions are satisfied by two or more combustion parameters, wherein the two or more combustion parameter conditions include at least two of the following:
  an in-cylinder pre-ignition gas parameter indicating a lack of incomplete combustion and misfire events in the internal combustion engine cylinder;
  an in-cylinder combustion event parameter indicating a lack of incomplete combustion and misfire events in the internal combustion engine cylinder;
  a cylinder wall temperature parameter in the internal combustion engine cylinder exceeding a cylinder wall temperature threshold; and
  a fuel injector tip temperature parameter of a fuel injector associated with the internal combustion engine cylinder exceeding a fuel injector tip temperature threshold.

28. The controller apparatus of claim 26, wherein the automatic start/stop control of the internal combustion engine is disabled in response to the processor determining that the at least one combustion parameter does not satisfy at least one combustion parameter condition and further that at least one operating parameter does not satisfy at least one operating condition, wherein the at least one combustion parameter condition includes at least one of the following:

- an in-cylinder pre-ignition gas parameter indicating incomplete combustion and misfire events in the internal combustion engine cylinder;
- an in-cylinder combustion event parameter indicating incomplete combustion and misfire events in the internal combustion engine cylinder;
- a cylinder wall temperature parameter in the internal combustion engine cylinder being less than a cylinder wall temperature threshold;
- a fuel injector tip temperature parameter of a fuel injector associated with the internal combustion engine cylinder being less than a fuel injector tip temperature threshold;

wherein the at least one operating condition includes at least one of the following:

- a fuelling system operating parameter not satisfying one of a fuel pressure operating condition and a fuel temperature operating condition;
- an exhaust gas recirculation (EGR) operating parameter indicating a presence of at least one of an overcooling and a condensation operating condition;
- an exhaust aftertreatment device temperature parameter indicating an under-temperature operating condition;
- a heat rejection operating parameter indicating a heat rejection operating condition less than a threshold amount; and
- an ambient operating parameter not satisfying an ambient operating condition.

\* \* \* \* \*